(12) United States Patent
Chang et al.

(10) Patent No.: US 8,201,044 B2
(45) Date of Patent: Jun. 12, 2012

(54) APPARATUS AND METHOD FOR TRANSMITTING CONTROL MESSAGE IN A WIRELESS COMMUNICATION SYSTEM USING RELAYING

(75) Inventors: Young-Bin Chang, Anyang-si (KR); Taori Rakesh, Suwon-si (KR); Chang-Yoon Oh, Yongin-si (KR); Sung-Jin Lee, Seoul (KR); Hyun-Jeong Kang, Seoul (KR); Jung-Je Son, Seongnam-si (KR); Hyoung-Kyu Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1142 days.

(21) Appl. No.: 12/038,395

(22) Filed: Feb. 27, 2008

(65) Prior Publication Data

US 2008/0209301 A1 Aug. 28, 2008

(30) Foreign Application Priority Data

Feb. 27, 2007 (KR) .................... 10-2007-0019914
Mar. 5, 2007 (KR) .................... 10-2007-0021678

(51) Int. Cl.
*G06F 11/00* (2006.01)
(52) U.S. Cl. ...................................... 714/749
(58) Field of Classification Search .................. 714/749
See application file for complete search history.

(56) References Cited

U.S. PATENT DOCUMENTS

| 7,400,856 B2 | 7/2008 | Sartori et al. | |
|---|---|---|---|
| 2007/0168826 A1* | 7/2007 | Terry et al. | 714/748 |
| 2007/0245201 A1* | 10/2007 | Sammour et al. | 714/748 |
| 2008/0022180 A1* | 1/2008 | Kuo | 714/748 |
| 2008/0043619 A1* | 2/2008 | Sammour et al. | 370/231 |
| 2008/0049718 A1* | 2/2008 | Chindapol et al. | 370/351 |
| 2008/0212467 A1* | 9/2008 | Hsieh et al. | 370/229 |
| 2008/0250293 A1* | 10/2008 | Taori et al. | 714/748 |
| 2009/0109892 A1* | 4/2009 | Oyman et al. | 370/315 |
| 2009/0217119 A1* | 8/2009 | Zhang et al. | 714/748 |
| 2010/0097987 A1* | 4/2010 | Chun et al. | 370/328 |
| 2010/0275087 A1* | 10/2010 | Doppler et al. | 714/749 |

FOREIGN PATENT DOCUMENTS

| CN | 1846371 | 10/2006 |
|---|---|---|
| WO | WO 2005/025110 | 3/2005 |
| WO | WO 2006/070665 | 7/2006 |
| WO | WO 2006/090669 | 8/2006 |

* cited by examiner

*Primary Examiner* — Bryce Bonzo
(74) *Attorney, Agent, or Firm* — The Farrell Law Firm, P.C.

(57) ABSTRACT

An apparatus and method for transmitting an ACK/NACK message from an RS in a wireless communication system using relaying is disclosed, in which the RS checks scheduling information for data transmission from a lower node, receives data from the lower node according to the scheduling information, checks errors in the data, generates error report information indicating whether the data has errors, and transmits the error report information to an upper node.

36 Claims, 7 Drawing Sheets

APPARATUS AND METHOD FOR TRANSMITTING CONTROL MESSAGE IN A WIRELESS COMMUNICATION SYSTEM USING RELAYING

PRIORITY

This application claims priority under 35 U.S.C. §119(a) to a Korean Patent Application filed in the Korean Intellectual Property Office on Feb. 27, 2007 and assigned Serial No. 2007-19914, and a Korean Patent Application filed in the Korean Intellectual Property Office on Mar. 5, 2007 and assigned Serial No. 2007-21678, the contents of each of which is hereby incorporated by reference.

BACKGROUND OF THE INVENTION

1. Field of the Invention

The present invention generally relates to an apparatus and method for performing Automatic Repeat reQuest (ARQ) in a wireless communication system. More particularly, the present invention relates to an apparatus and method for transmitting ACKnowledgment (ACK) or Negative ACKnowledgment (NACK) information on the uplink connection from a Relay Station (RS) in a wireless communication system using relaying.

2. Description of the Related Art

Data may have errors according to the channel state of radio resources carrying the data in a wireless communication system. The wireless communication system can correct or control the errors using ARQ and Forward Error Correction (FEC). ARQ is a scheme in which a receiver requests a retransmission of erroneous data to a transmitter; whereas FEC is a scheme in which a receiver corrects errors in lost data.

When the wireless communication system adopts ARQ, the receiver checks errors in a received packet by decoding it. If the packet has no errors, the receiver transmits ACK information to the transmitter. If the packet has errors, the receiver transmits NACK information to the transmitter.

Upon receipt of the ACK information, the transmitter transmits a new packet. On the other hand, upon receipt of the NACK information, the transmitter retransmits the packet.

The ARQ scheme is performed in the procedure illustrated in FIG. 1.

FIG. 1 illustrates a conventional retransmission procedure in a wireless communication system.

Referring to FIG. 1, a Base Station (BS) 100 transmits in step 111 scheduling information to a Mobile Station (MS) 102, for use in uplink data transmission.

The MS 102 transmits in step 113 uplink data to the BS 100 according to the scheduling information.

In step 115, the BS 100 checks errors in the received uplink data. If the uplink data has errors, the BS 100 transmits in step 117 a NACK message to the MS 102, requesting retransmission of the uplink data.

Then the BS 100 transmits in step 119 scheduling information for the data retransmission to the MS 102.

Upon receipt of the scheduling information, the MS 102 retransmits in step 121 the uplink data to the BS 100 according to the scheduling information.

In step 123, the BS 100 checks errors in the received data. If the uplink data has no errors, the BS 100 transmits in step 125 ACK information to the MS 102.

Recently, the wireless communication system has used an RS-based relay scheme in order to provide better radio channels to MSs at a cell boundary or in a shadowing area. In other words, the wireless communication system using relaying can provide a better radio channel between a BS and an MS by relaying data between them via an RS.

Accordingly, there is a need for a method for performing ARQ using an RS in a wireless communication system using relaying.

SUMMARY OF THE INVENTION

An aspect of the present invention is to address at least the problems and/or disadvantages described above and to provide at least the advantages described below. Accordingly, an aspect of the present invention is to provide an apparatus and method for performing ARQ in a wireless communication system using relaying.

Moreover, an aspect of the present invention provides an apparatus and method for reporting to a BS whether uplink relay data has errors in an RS in a wireless communication system using relaying.

In accordance with an aspect of the present invention, there is provided a retransmission method of an RS in a wireless communication system using relaying, in which the RS checks scheduling information for data transmission from a lower node, receives data from the lower node according to the scheduling information, checks errors in the data, generates error report information indicating whether the data has errors, and transmits the error report information to an upper node.

In accordance with another aspect of the present invention, there is provided a retransmission method of a BS in a wireless communication system using relaying, in which the BS transmits to an RS scheduling information for the RS to transmit error report information indicating whether data received from a lower node has errors, determines whether the error report information has been received from the RS according to the scheduling information, and determines whether the data has errors from the error report information, upon receipt of the error report information from the RS.

In accordance with a further aspect of the present invention, there is provided a retransmission apparatus of an RS in a wireless communication system using relaying, in which an error checker checks errors in data received from a lower node, a data queue stores data without errors, a retransmission controller controls data retransmission, upon receipt of a retransmission request from an upper node, an information generator generates error report information indicating whether data received from the lower node has errors, and a transmitter transmits the error report information to the upper node.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for reporting to an upper node whether relay data has errors by an RS when ARQ is performed in a wireless communication system using relaying. That is, the embodiments of the present invention provide a technique in which an RS reports to an upper node by ACK/NACK information whether uplink data received from a lower node has errors. The upper node is a BS or an upper RS, herein a BS by way of example. The lower node is an MS or a lower RS, herein an MS by way of example.

While the present invention will be described in the context of an Orthogonal Frequency Division Multiple Access (OFDMA) wireless communication system, it is to be clearly understood that the present invention is also applicable to other multiple access communication systems.

Figure 1:
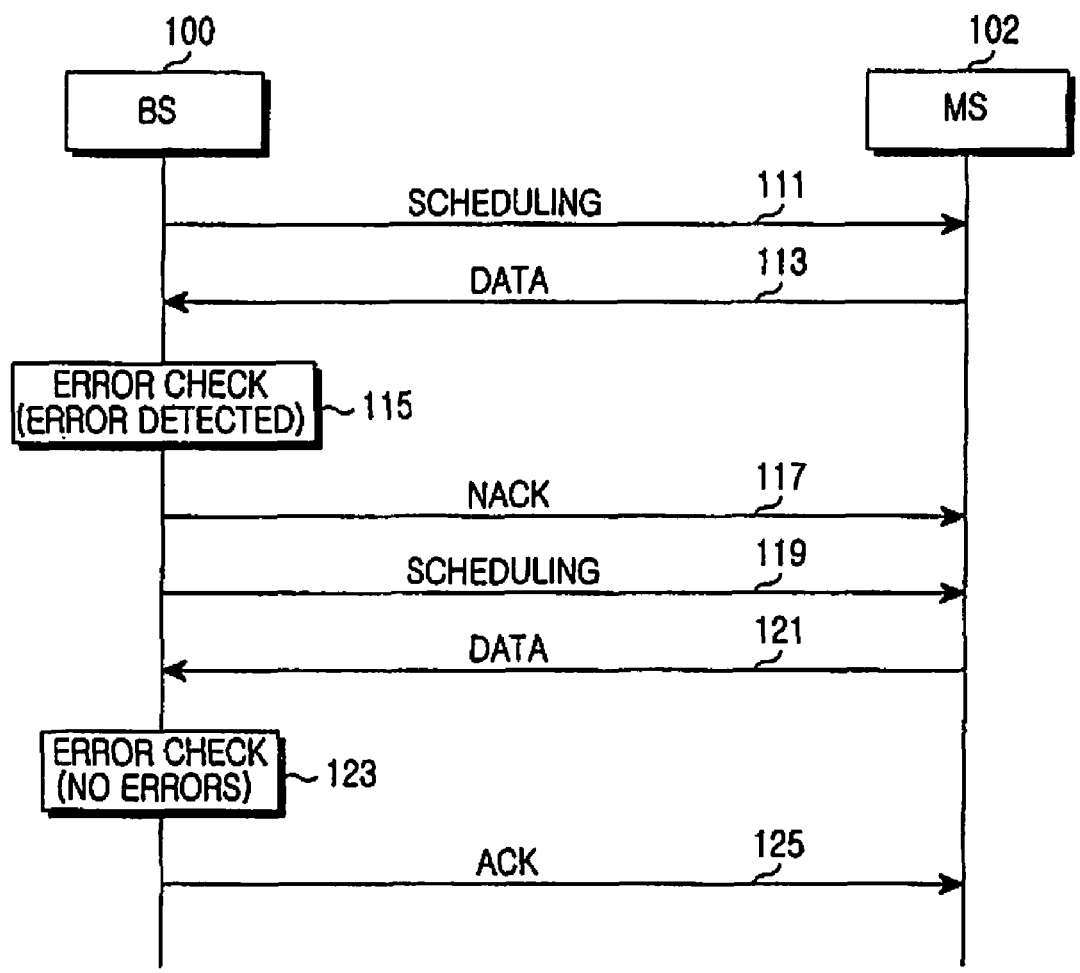
FIG. 1 illustrates a conventional retransmission procedure in a wireless communication system.
Figure 2:
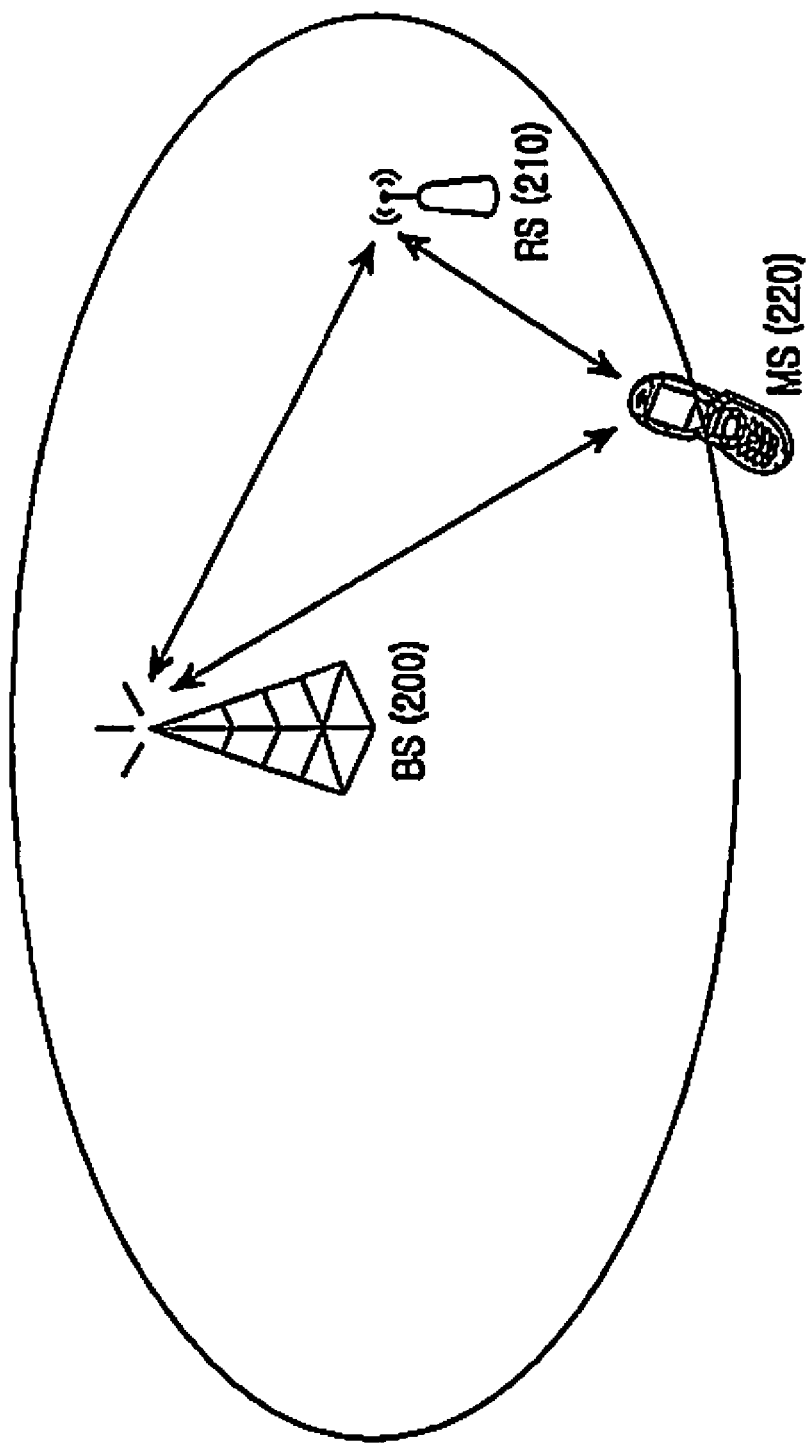
FIG. 2 illustrates the configuration of a wireless communication system using relaying according to an embodiment of the present invention.

In the wireless communication system using relaying, an RS relays signals between a BS and an MS as illustrated in FIG. 2.

FIG. 2 illustrates the configuration of a wireless communication system using relaying according to an exemplary embodiment of the present invention.

Referring to FIG. 2, an MS 220 within the service area of a BS 200 receives a service from the BS 200 via a direct link. However, if the MS 220 is located at an edge of the service area (i.e. at a cell boundary), the channel state between the BS 200 and the MS 220 is poor and thus the BS 200 cannot provide a high-speed data channel to the MS 220.

However, the BS 200 may provide high-speed data channels to MSs in poor channel state such as the MS 220 via an RS 210. On the downlink, the MS 220 receives high-speed data from the BS 200 via the RS 210. Since the MS 220 is within the service area of the BS 200, it can receive a control signal and low-speed data from the BS 200 via the direct link.

On the uplink, the BS 200 receives high-speed data from the MS 220 via the RS. The BS 200 can receive a low-speed data signal from the MS 220 via the direct link.

As described above, the BS, the RS and the MS can communicate with one another in the wireless communication system using relaying. The BS and the MS can exchange data via the RS.

Also, the BS and the MS can exchange data via the direct link without the aid of the RS. Then, the RS can listen to data transmitted between the BS and the MS.

As described above, the BS can receive uplink data from the MS or the RS. For the uplink data reception, the BS can select a node from which to receive data with a high reception success rate between the MS and the RS.

If the BS detects errors in the uplink data, the BS can select a node from which to receive retransmission data of the uplink data according to the reception success rate or the channel state between the MS and the RS. For example, for data retransmission, the wireless communication system operates in the procedure illustrated in FIG. 3. The following description is made on the assumption that the BS receives uplink data and its retransmission from the RS.

Figure 3:
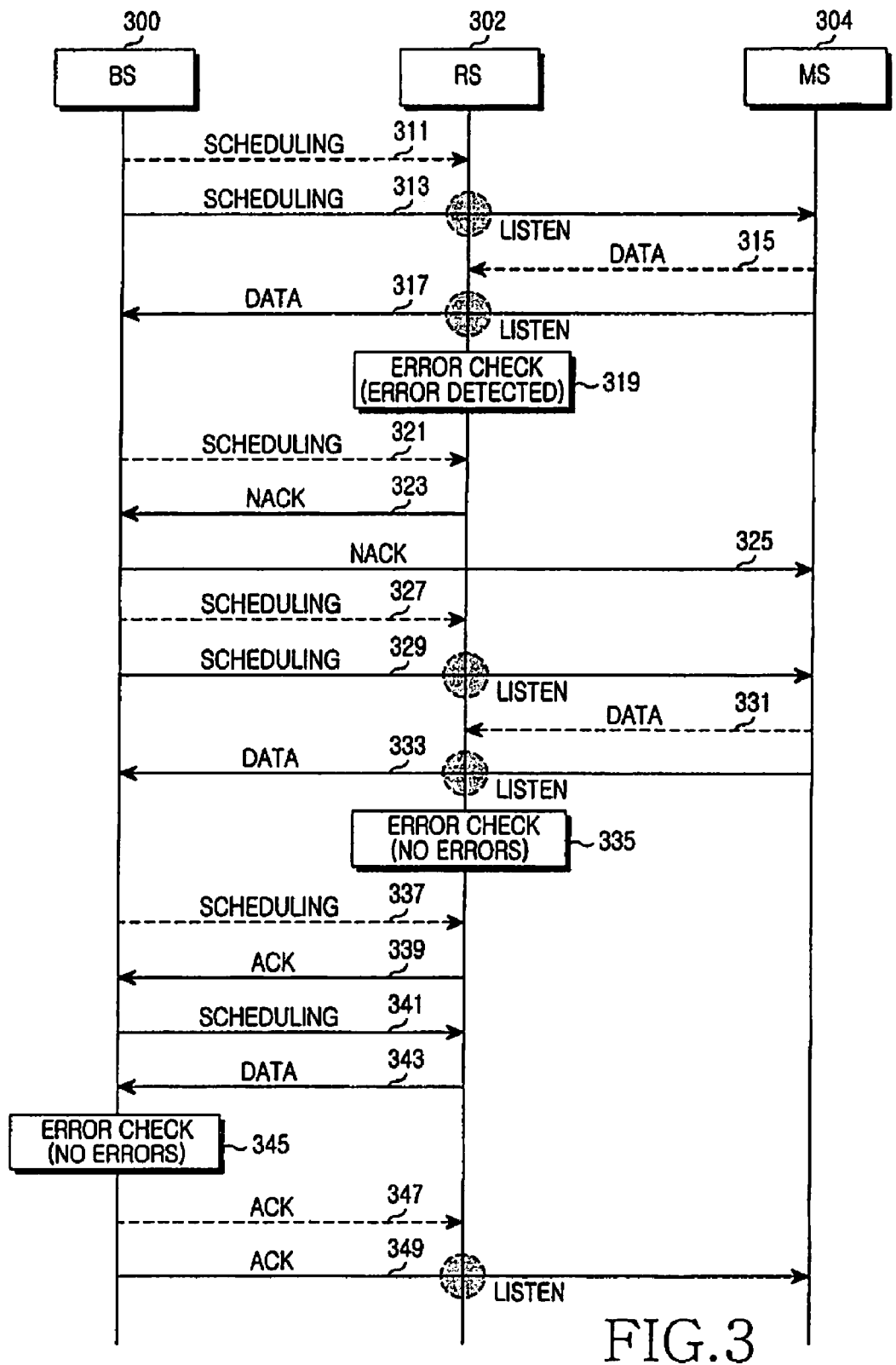
FIG. 3 illustrates a procedure for retransmitting an uplink signal in the wireless communication system using relaying according to an embodiment of the present invention.

FIG. 3 illustrates a procedure for retransmitting an uplink signal in the wireless communication system using relaying according to an embodiment of the present invention.

Referring to FIG. 3, a BS 300 transmits to an RS 302 in step 311 and/or an MS 304 in step 313 scheduling information about resources in which the MS 304 will transmit uplink data. For example, the BS 300 transmits the scheduling information to both the RS 302 and the MS 304, or to the MS 304 via the RS 302.

It can be further contemplated as another embodiment of the present invention that the BS 300 transmits the scheduling information to the MS 304 only. In this case, the RS 302 listens to the scheduling information directed to the MS 304 and checks the uplink scheduling information for the MS 304. The scheduling information includes resource allocation information indicating resources in which uplink data will be transmitted, a Modulation and Coding Scheme (MCS), an Identifier (ID) of the MS to transmit the uplink data according to the scheduling information, and the transmit power of the uplink data.

The RS 302 and the MS 304 detect a time at which the MS 304 is scheduled to transmit data and the resource allocation information from the scheduling information.

In step 315 or 317, the MS 304 transmits uplink data according to the scheduling information. For example, the MS 304 transmits in step 315 the uplink data to the RS 302 according to the scheduling information. If the MS 304 is not aware of the RS 302, the MS 304 transmits in step 317 the uplink data to the BS. In this case, the RS 302 listens to the data directed to the BS 300 according to the scheduling information.

The RS 302 in step 319 checks for errors in the data received from the MS 304, for example, using the Cyclic Redundancy Check (CRC) of the data.

To allow the RS 302 to report whether the uplink data has errors, the BS 300 transmits in step 321 scheduling information to the RS 302. Since the BS 300 can determine the time when the MS 304 will transmit data using the uplink scheduling information of the MS 304, the BS 300 transmits the scheduling information for transmission of ACK/NACK information to the RS 302, taking into account the data transmission time of the MS 304. If an ACK/NACK channel carrying the ACK/NACK information is preset between the BS 300 and the RS 302, the BS 300 does not need to provide the scheduling information for ACK/NACK transmission to the RS 302.

If the uplink data has errors, the RS 302 transmits in step 323 NACK information to the BS 300.

Upon receipt of the NACK information, the BS 300 transmits in step 325 a NACK message to the MS 304, requesting retransmission of the uplink data.

In step 327 or 329, the BS 300 transmits scheduling information for retransmission of the erroneous data to the RS 302 and the MS 304. For example, the BS 300 transmits the scheduling information to both the RS 302 and the MS 304, or to the MS 304 via the RS 302.

It can be further contemplated as another embodiment of the present invention that the BS 300 transmits the scheduling information to the MS 304 only. In this case, the RS 302 listens to the scheduling information directed to the MS 304.

The RS 302 and the MS 304 detect a time when the MS 304 will retransmit the data and resource allocation information associated with the data retransmission from the scheduling information.

In step 331 or 333, the MS 304 retransmits the data according to the scheduling information. For example, the MS 304 retransmits in step 331 the data to the RS 302 according to the scheduling information. If the MS 304 is not aware of the RS 302, the MS 304 retransmits in step 333 the data to the BS. In this case, the RS 302 listens to the retransmission data directed to the BS 300.

In step 335, the RS 302 checks for errors in the retransmission data received from the MS 304, for example using the CRC of the data.

To allow the RS 302 to report whether the retransmission data has errors, the BS 300 transmits in step 337 scheduling information to the RS 302. Since the BS 300 can determine the time when the MS 304 will transmit data from the uplink scheduling information of the MS 304, the MS 300 transmits scheduling information for transmission of ACK/NACK information to the RS 302, taking into account the data transmission time of the MS 304. If an ACK/NACK channel carrying the ACK/NACK information is preset between the BS 300 and the RS 302, the BS 300 does not need to provide the scheduling information for ACK/NACK transmission to the RS 302.

If the uplink data has no errors, the RS 302 transmits in step 339 ACK information to the BS 300.

Upon receipt of the ACK information, the BS 300 transmits in step 341 to the RS 302 scheduling information by which the RS 302 will transmit uplink data. Upon receipt of the ACK information from the RS 302, the BS 300 can transmit ACK information to the MS 304.

In step 343, the RS 302 transmits the retransmission data received from the MS 304 to the BS 300 according to the scheduling information.

The BS 300 in step 345 checks for errors in the data received from the RS 302, for example, by the CRC of the data.

If the data has no errors, the BS 300 transmits in step 347 or 349 ACK information to the RS 302 and the MS 304. For example, the BS 300 transmits the ACK message to both the RS 302 and the MS 304, or to the MS 304 via the RS 302.

In another embodiment of the present invention, the BS 300 transmits the ACK information to the MS 304 only. In this case, the RS 302 listens to the ACK information directed to the MS 304 and determines that the data transmitted to the BS 300 has no errors. If the RS 302 has not received NACK information or scheduling information associated with data retransmission from the BS 300 within a predetermined time, the RS 302 determines that the data transmitted to the BS 300 is free of errors.

As described above, in the case where the BS receives uplink data from the MS via the RS, the RS reports to the BS whether the data has errors by ACK/NACK information. For example, if the data received from the MS has errors, the RS transmits NACK information to the BS. If the data has no errors, the RS transmits ACK information to the BS.

Upon receipt of the ACK information from the RS, the BS transmits scheduling information for data corresponding to the ACK information to the RS and receives the data from the RS.

On the other hand, upon receipt of the NACK information, the BS transmits scheduling information for data corresponding to the NACK information to the MS, requesting retransmission of the data.

The RS transmits ACK/NACK information to the BS according to scheduling information received from the BS in order to report whether data received from the MS has errors. The ACK/NACK information can be transmitted to the BS on a physical channel defined for reporting whether the data has errors, in an information element of a control message, in a Medium Access Control (MAC) subheader or header that can be transmitted along with the data. If the RS uses the physical channel, the BS should provide scheduling information for the physical channel to the RS. Yet, when the physical channel is preset between the BS and the RS, the BS does not need to provide the scheduling information for the physical channel to the RS. If the RS uses the control message, the MAC header, or the MAC subheader, the RS transmits ACK/NACK information to the BS according to the scheduling information received from the BS.

A message carrying the ACK/NACK information optionally includes an ID of the RS that transmits the ACK/NACK information, an ID of the MS that transmitted data to the RS, a sequence number identifying a data block received from the MS, and an indication bit representing ACK/NACK information for the data block.

There are two major retransmission schemes for the wireless communication system, a MAC retransmission scheme operated in the MAC layer and a Physical layer (PHY) retransmission scheme operated in the physical layer. The PHY retransmission scheme is also called Hybrid ARQ (HARQ).

In the MAC retransmission scheme, the RS can transmit ACK/NACK information to the BS in a control message, a MAC subheader or a MAC header. Each of the control message, the MAC subheader, and the MAC header includes a Connection ID (CID) allocated to the RS that transmits the ACK/NACK information, a CID allocated to the MS that transmitted data to the RS, a Block Sequence Number (BSN) being a unique sequence value that identifies a data block received from the MS, an ARQ type, and a bitmap with indication bits representing ACK/NACK information for data blocks according to their BSNs.

In the PHY retransmission scheme, the RS can transmit ACK/NACK information to the BS on a physical channel defined for reporting whether data has errors, or in a control message, a MAC subheader or a MAC header. Each of the control message, the MAC subheader, and the MAC header includes the CID allocated to the RS that transmits the ACK/NACK information, the CID allocated to the MS that transmitted data to the RS, an HARQ Channel ID (ACID) being a unique number of an HARQ data channel to indicate a unique sequence value of a data block received from the MS, a SubPacket ID (SPID) indicating a unique number of a subdata block in the ACID, an ARQ Identifier_Sequence Number (AI_SN) indicating whether the data is retransmission data, an ARQ type, and a bitmap with indication bits representing ACK/NACK information for data blocks.

If the RS transmits ACK/NACK information on the physical channel, the RS arranges ACK/NACK information for data blocks received from the MS in a bitmap according to a rule set by the BS or according to scheduling information that the BS transmitted to the MS, for uplink data transmission, and transmits the bitmap to the BS.

If HARQ is adopted, the BS should allocate resources in which the RS will transmit ACK/NACK information for uplink data received from the MS. For example, the BS allocates an ACK/NACK information area for the RS using an information element having the same configuration as an HARQ ACK Region Allocation information element among information elements included in an uplink MAP defined by Institute of Electrical and Electronics Engineers (IEEE) 802.16e. That is, the BS indicates the HARQ ACK Region Allocation information element includes resource allocation information about the ACK/NACK information area of the RS by setting an Extended-2 UIUC (Uplink Interval Usage Code) field of the HARQ ACK Region Allocation information element to a different value.

The BS also notifies the RS of a time when the RS is scheduled to transmit ACK/NACK information by adding new information to an Uplink Channel Descriptor (UCD) message defined by IEEE 802.16e.

For example, the BS transmits to the RS scheduling information requesting the RS to transmit ACK/NACK information for data k frames after receiving the data. If the RS receives uplink data from the MS in a $j^{th}$ physical frame, the RS transmits to the BS ACK/NACK information for the received data in resources allocated by the HARQ ACK Region Allocation information element in a $(j+k)^{th}$ frame.

Now a description will be made of an operation of the BS in relation to the retransmission of uplink data in the wireless communication system using relaying.

Figure 4:
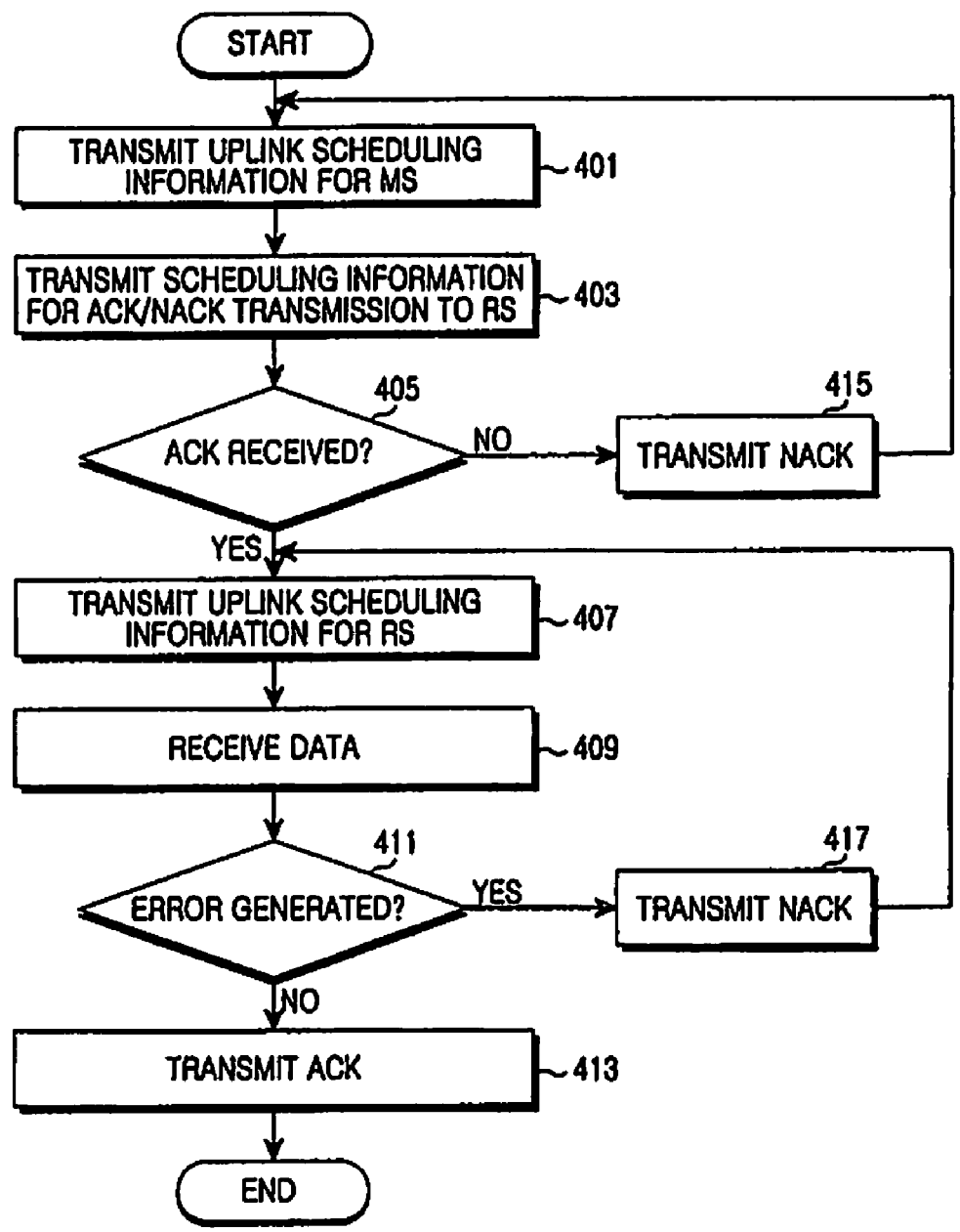
FIG. 4 is a flowchart of an operation of a BS, for retransmission of an uplink in the wireless communication system using relaying according to an embodiment of the present invention.

FIG. 4 is a flowchart of an operation of the BS, for retransmission of an uplink in the wireless communication system using relaying according to an embodiment of the present invention.

Referring to FIG. 4, the BS transmits in step 401 to the RS and the MS scheduling information about resources in which the MS will transmit uplink data. For example, the BS transmits the scheduling information to both the RS and the MS, or to the MS via the RS. It can be further contemplated as another embodiment of the present invention that the BS transmits the scheduling information to the MS only. In this case, the RS listens to the scheduling information directed to the MS and checks the uplink scheduling information for the MS.

The BS 300 transmits in step 403 scheduling information by which the RS transmits an ACK/NACK message, taking into account a data transmission time of the MS. If a channel carrying the ACK/NACK information is preset between the BS and the RS, the BS does not need to provide the scheduling information for ACK/NACK transmission to the RS.

In step 405, the BS monitors whether an ACK message has been received from the RS by checking a physical channel defined for reporting whether data has errors, a control message, a MAC subheader, or a MAC header.

Upon receipt of a NACK message, the BS transmits in step 415 a NACK message to the MS, requesting retransmission of the uplink data.

Then the BS returns to step 401 in which the BS transmits scheduling information for retransmission of the erroneous data to the RS and the MS.

Upon receipt of an ACK message, the BS transmits in step 407 scheduling information for uplink data transmission to the RS. At the same time, the BS can transmit an ACK message to the MS.

The BS receives the data from the RS according to the scheduling information in step 409 and in step 411 checks errors in the data, for example using a CRC.

If the data has errors, the BS transmits in step 417 a NACK message to the RS, requesting retransmission of the data and transmits in step 407 scheduling information for the data retransmission to the RS.

On the contrary, if the data has no errors, the BS transmits in step 413 an ACK message to the RS or the MS. For example, the BS transmits the ACK message to both the RS and the MS or only of the RS and the MS.

Then the BS ends the process.

As described above, when the BS detects errors in received data, the BS performs the data retransmission procedure with the RS or the MS. Upon expiration of a lifetime set for data retransmission, the BS ends the retransmission procedure.

While the BS transmits scheduling information associated with ACK/NACK transmission and scheduling information associated with uplink data transmission to the RS in the above-described embodiment of the present invention, it can be further contemplated as another embodiment of the present invention that when the RS transmits ACK/NACK information in a control message, a MAC subheader, or a MAC header, the BS includes the scheduling information associated with ACK/NACK transmission in the scheduling information associated with uplink data transmission.

An uplink data retransmission operation of the RS in the wireless communication system using relaying will be described with reference to FIG. 5.

Figure 5:
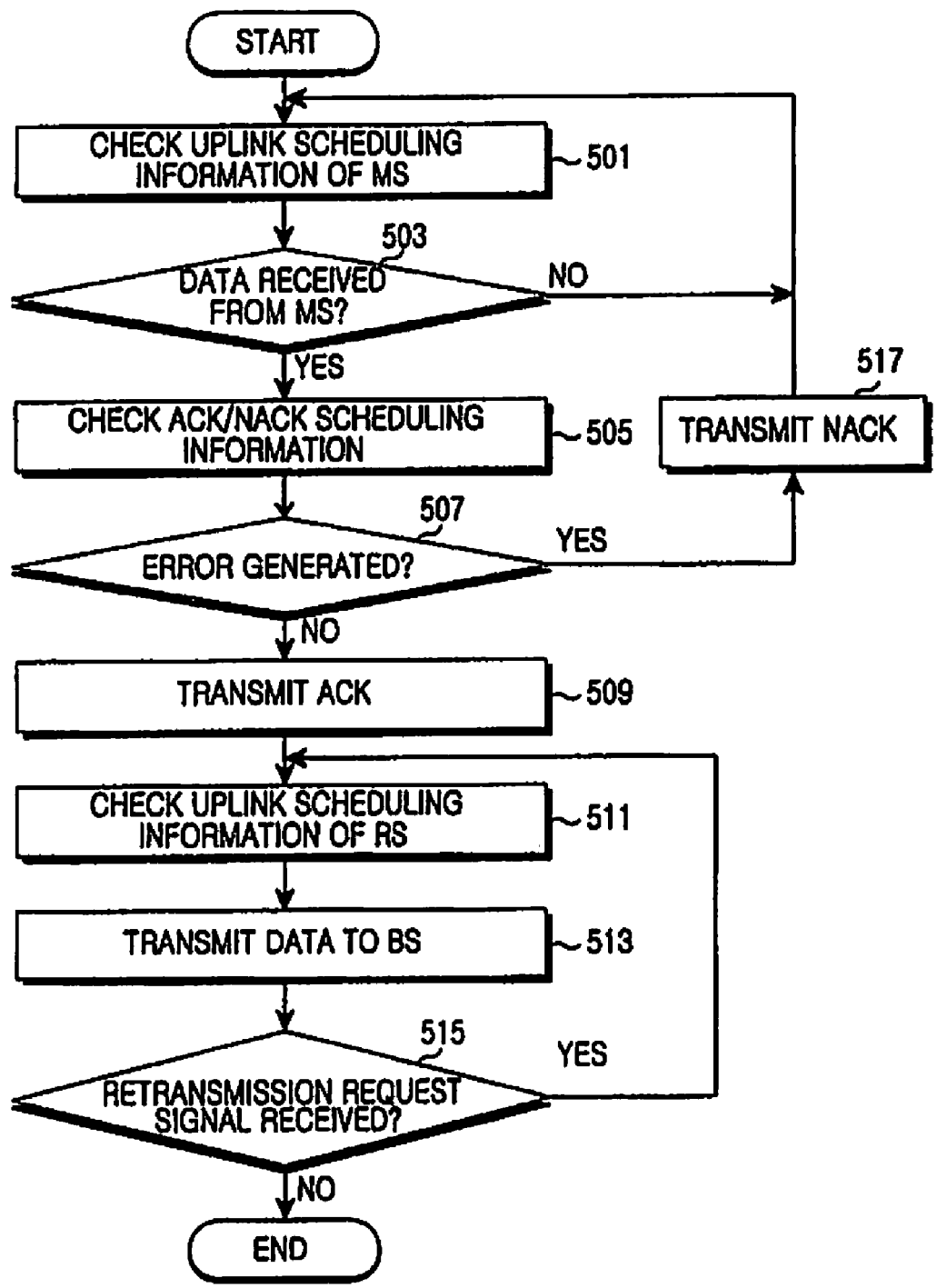
FIG. 5 is a flowchart of an operation of an RS for relaying an uplink signal in the wireless communication system using relaying according to an embodiment of the present invention.

FIG. 5 is a flowchart of an operation of the RS for relaying an uplink signal in the wireless communication system using relaying according to an embodiment of the present invention.

Referring to FIG. 5, the RS checks in step 501 uplink scheduling information of the MS. The RS receives the uplink scheduling information from the BS or listens to the uplink scheduling information directed from the BS to the MS.

In step 503, the RS monitors data reception from the MS according to the scheduling information. If data has not been received within a predetermined time, the RS returns to step 501.

Upon receipt of data from the MS, the RS checks in step 505 scheduling information associated with ACK/NACK transmission received from the BS in.

In step 507, the RS checks for errors in the received data, for example by a CRC. Herein, step 507 may precede step 505.

If the received data has errors, the RS transmits in step 517 a NACK message to the BS according to the scheduling information associated with ACK/NACK transmission. The NACK message is transmitted on a physical channel defined for reporting whether data has errors, or in a control message, a MAC subheader or a MAC header.

Then the RS returns to step 501 to check uplink scheduling information of the MS.

On the other hand, if the data received from the MS has no errors, the RS transmits in step 509 an ACK message to the BS according to the scheduling information associated with ACK/NACK transmission. The ACK message is transmitted on a physical channel defined for reporting whether data has errors, or in a control message, a MAC subheader or a MAC header.

Then the RS checks in step 511 scheduling information associated with uplink data transmission and transmits in step 513 the data received from the MS to the BS according to the scheduling information.

In step 515, the RS monitors whether a retransmission request signal has been received from the BS. The retransmission request signal is scheduling information associated with NACK transmission or data retransmission.

Upon receipt of the retransmission request signal, the RS returns to step 511 and checks scheduling information associated with the data retransmission. For example, if the RS receives a NACK message from the BS, the RS checks the scheduling information associated with the data retransmission received form the BS, considering that the data transmitted to the BS has errors.

Meanwhile, if the retransmission request signal has not been received, the RS ends the process. For example, if the RS receives an ACK message from the BS, the RS ends the process. The ACK message is received directly from the BS or indirectly by listening to the message sent from the BS.

In another embodiment of the present invention, if the RS has not received the retransmission request signal from the BS within a predetermined time, the RS ends the process, considering that the data transmitted to the BS has no errors.

As described above, the RS performs the data retransmission procedure, upon request of the BS. Upon expiration of a lifetime set for data retransmission, the RS ends the retransmission procedure.

To support the relay service, a frame is configured so as to include an ACK/NACK transmission area in the wireless communication system.

Figure 6:
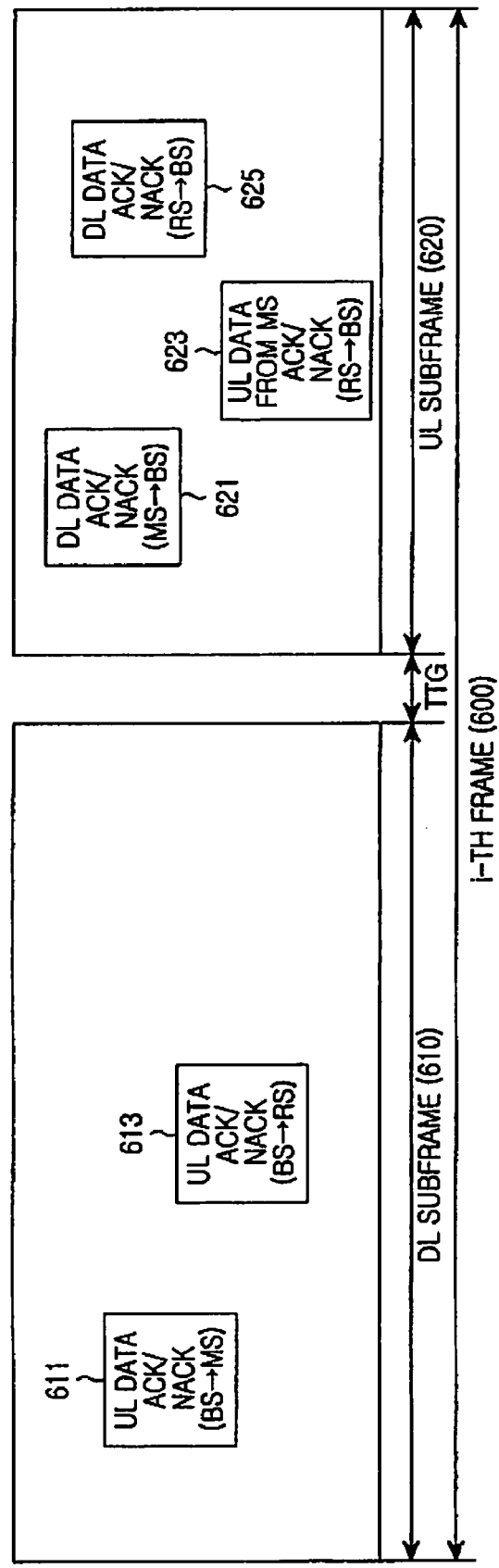
FIG. 6 illustrates a frame structure for transmitting an ACK/NACK signal in the wireless communication system using relaying according to an embodiment of the present invention.

FIG. 6 illustrates a frame structure for transmitting an ACK/NACK signal in the wireless communication system using relaying according to an embodiment of the present invention.

Referring to FIG. 6, a frame 600 includes a DownLink (DL) subframe 610 and an UpLink (UL) subframe 620.

The BS transmits DL data to the RS and the MS in a part of the DL subframe 610. The RS transmits DL data to the MS in another part of the DL subframe 610.

The BS transmits ACK/NACK information for UL data received from the MS in a first area 611 of the DL subframe 610. Also, the BS transmits ACK/NACK information for UL data received from the RS in a second area 613 of the DL subframe 610.

The MS transmits UL data to the RS and the BS in a part of the UL subframe 620. The RS transmits UL data to the BS in another part of the UL subframe 620.

The MS transmits ACK/NACK information for DL data received from the BS in a third area 621 of the UL subframe 620. Also, the MS transmits ACK/NACK information for DL data received from the RS in a third area 625 of the UL subframe 620.

The RS transmits ACK/NACK information for DL data received from the BS in a fifth area 625 of the UL subframe 620. Notably, the RS can transmit the ACK/NACK information on a separately procured physical channel for ACK/NACK transmission, in a control message, in a MAC subheader, or in a MAC header.

Now a description will be made of the configurations of the BS, the RS and the MS for data retransmission in the wireless communication system. Since the BS and the RS have the same configuration, the RS will be described with reference to FIG. 7, without a description of the configurations of the BS and the MS.

Figure 7:
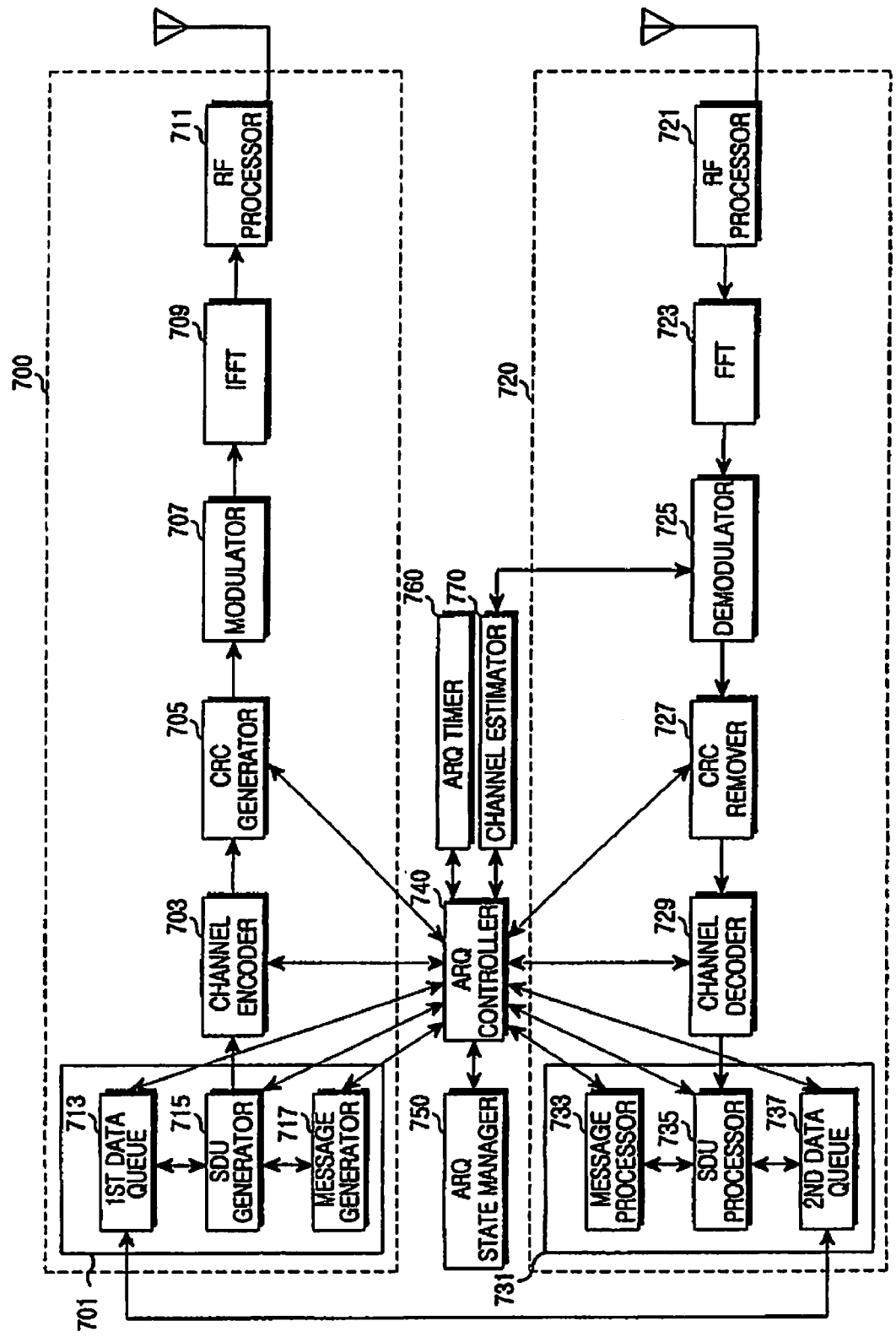
FIG. 7 is a block diagram of the RS in the wireless communication system using relaying according to an embodiment of the present invention.

FIG. 7 is a block diagram of the RS in the wireless communication system using relaying according to an embodiment of the present invention.

While the following description is made on the assumption that a transmitter 700 and a receiver 720 have different antennas, they may share a single antenna.

Referring to FIG. 7, the RS includes the transmitter 700, the receiver 720, an ARQ controller 740 shared between the transmitter 700 and the receiver 720, an ARQ state manager 750, an ARQ timer 760, and a channel estimator 770.

The transmitter 700 has a data generator 701, a channel encoder 703, a CRC generator 705, a modulator 707, an Inverse Fast Fourier Transform (IFFT) processor 709, and a Radio Frequency (RF) processor 711.

The data generator 701 forms data to be transmitted in the physical layer by collecting data stored in a first data queue 713 and a control message generated from a message generator 717 at a Service Data Unit (SDU) generator 715. The message generator 717 generates an ACK message to be transmitted to the BS, if data received from the MS through the receiver 720 has no errors. If the data has errors, the message generator 717 generates a NACK message for transmission to the BS. Herein, the message generator 717 generates an ACK/NACK message to be transmitted on a physical channel defined for reporting the presence or absence of errors, or a control message, MAC subheader or MAC header that includes ACK/NACK information. The ACK/NACK message, the control message, the MAC header, and the MAC header each have an ID of the RS that transmits the ACK/NACK information, a sequence number identifying a data block corresponding to the ACK/NACK information among data blocks received from the MS, and an indication bit representing ACK/NACK information for the data block according to the sequence number of the data block.

The channel encoder 703 encodes the data received from the data generator 701 at a predetermined modulation level (e.g. an MCS level). The CRC generator 705 generates an error detection code and adds it to the channel-coded data.

The modulator 707 modulates the CRC-added data at the modulation level (e.g. the MCS level).

The IFFT processor 709 converts the frequency data received from the modulator 707 to a time signal by IFFT.

The RF processor 711 up-converts the baseband signal received from the IFFT processor 709 to an RF signal and transmits the RF signal to the BS or the MS through an antenna.

The receiver 720 includes an RF processor 721, a Fast Fourier Transform (FFT) processor 723, a demodulator 725, a CRC remover 727, a channel decoder 729, and a data processor 731.

The RF processor 721 down-converts an RF signal received from the BS or the MS through an antenna to a baseband signal.

The FFT processor 723 converts the time signal received from the RF processor 721 to a frequency signal by FFT.

The demodulator 725 demodulates the frequency signal at a predetermined modulation level.

The CRC remover 727 determines whether the demodulated signal has errors by checking the error detection code of the demodulated signal and removes the error detection code.

The channel decoder 729 decodes the CRC-free signal without errors received form the CRC remover 727 according to the modulation level.

In the data processor 731, an SDU processor 735 separates data and a control message from the physical layer signal received from the channel decoder 729. Then SDU processor 735 then stores the data in a second data queue 737 and provides the control message to the message 733 for decoding. The first and second queues 713 and 733 may be incorporated into a single data queue. Upon receipt of a NACK message from the BS, the message processor 733 notifies the ARQ controller 740 of the reception of the NACK message.

The ARQ state manager 750 manages the ARQ state of retransmission data. The ARQ timer 760 manages the lifetime of retransmission.

The ARQ controller 740 provides overall control to the ARQ operation of the RS in conjunction with the ARQ state manger 750 and the ARQ timer 760. The ARQ controller 740 controls retransmission in communication with the data generator 701, the channel encoder 703, and the CRC generator 705 of the transmitter 700. For example, upon receipt of a retransmission request from the BS through the receiver 720, the ARQ processor 740 controls data received from the MS and stored in the first data queue 713 to be encoded according to channel state, added with an error detection code, and retransmitted to the BS.

The ARQ controller 740 also controls the retransmission in communication with the data processor 731, the channel decoder 729, and the CRC remover 727 of the receiver 720. For example, when errors are detected in received data in the CRC remover 727, the ARQ controller 740 controls the message generator 717 to generate a NACK message for transmission to the BS.

The ARQ controller 740 ends the retransmission procedure, upon receipt of a lifetime expiration message from the ARQ timer 760 during the retransmission.

While the retransmission procedure has been described in the context of the relay service via a single RS in the wireless communication system, it is also applicable to a multi-hop relay wireless communication system.

As is apparent from the above description, the present invention advantageously saves radio resources because an RS reports to a BS whether an uplink signal received from an MS has errors in an ARQ operation and thus the BS receives only an error-free signal from the RS in a wireless communication system using relaying.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A retransmission method of a Relay Station (RS) in a wireless communication system using relaying, the method comprising:
    checking scheduling information for data transmission from a lower node;
    receiving data from the lower node according to the scheduling information;
    checking for errors in the data;
    generating error report information indicating whether the data has errors;
    transmitting the error report information to an upper node;
    checking scheduling information received from the upper node when the transmitted error report information is an ACKnowledgment (ACK);
    transmitting the data received from the lower node to the upper node according to the scheduling information; and
    retransmitting the data to the upper node, upon receipt of a retransmission request signal from the upper node.

2. The retransmission method of claim 1, wherein the scheduling information is received form the upper node.

3. The retransmission method of claim 1, wherein the scheduling information is acquired by listening to the scheduling information, which is transmitted from the BS to the MS, for the MS to send data.

4. The retransmission method of claim 1, wherein the error report information is configured in the form of one of a physical channel defined for reporting presence or absence of errors, a control message, a Medium Access Control (MAC) subheader, and a MAC header.

5. The retransmission method of claim 1, wherein the error report information includes at least one of an Identifier (ID) of the RS, an ID of the lower node that transmitted the data to the RS, a sequence number identifying a data block received from the lower node, and an indication bit indicating whether the data block has errors according to the sequence number of the data block.

6. The retransmission method of claim 5, wherein the indication bit represents one of a Negative ACKnowledgment (NACK) indicating the presence of errors, if the data has errors, and an ACKnowledgment (ACK) indicating the absence of errors, if the data has no errors.

7. The retransmission method of claim 1, wherein if Medium Access Control (MAC) retransmission is performed, the error report information includes at least one of a Connection ID (CID) of the RS, a CID of the lower node that transmitted the data to the RS, a Block Sequence Number (BSN) identifying a data block received from the lower node, a retransmission type, and an indication bit indicating whether the data block has errors according to the BSN of the data block.

8. The retransmission method of claim 1, wherein if physical layer retransmission is performed, the error report information includes at least one of a Connection ID (CID) of the RS, a CID of the lower node that transmitted the data to the RS, a Hybrid Automatic Repeat reQuest Channel ID (ACID) being a sequence number identifying a data block received from the lower node, a SubPacket ID (SPID) identifying a subdata block in the ACID, an ARQ Identifier_Sequence Number (AI_SN) indicating whether the data is retransmission data, a retransmission type, and an indication bit indicating whether the data block has errors.

9. The retransmission method of claim 1, wherein the transmitting comprises transmitting the error report information in an area allocated for transmission of a message indicating whether data has errors in an uplink subframe according to a frame structure.

10. The retransmission method of claim 1, wherein the transmitting comprises:
    detecting control information for transmission of the error report information in scheduling information received from the upper node; and
    transmitting the error report information to the upper node according to the control information.

11. The retransmission method of claim 10, wherein the control information includes at least one of a time to transmit the error report information and resource allocation information for transmission of the error report information.

12. The retransmission method of claim 1, wherein the retransmission comprises:
    checking scheduling information for data retransmission received from the upper node, upon receipt of a Negative ACKnowledgment (NACK) from the upper node; and
    retransmitting the data to the upper node according to the scheduling information.

13. The retransmission method of claim 1, wherein the retransmission comprises, if scheduling information for data retransmission is received from the upper node, retransmitting the data to the upper node according to the scheduling information.

14. The retransmission method of claim 1, if the data is retransmitted, further comprising:

checking a lifetime for the retransmission; and
ending the data retransmission when the lifetime expires.

15. The retransmission method of claim 1, wherein receiving data from the lower node includes listening to data transmitted directly from the lower node to the upper node, and wherein the errors checked for in the data are listened to by the RS.

16. A retransmission method of a Base Station (BS) in a wireless communication system using relaying, the method comprising:
    transmitting to a Relay Station (RS) scheduling information for the RS to transmit error report information indicating whether data received from a lower node has errors;
    determining whether the error report information has been received from the RS according to the scheduling information;
    determining whether the data has errors from the error report information, upon receipt of the error report information from the RS;
    transmitting scheduling information to the RS when an ACKnowledgment (ACK) representing the absence of errors in the data is received from the RS, in order for the RS to transmit the data received from the lower node;
    checking for errors in the data received from the RS, upon receipt of the data according to the scheduling information; and
    requesting retransmission of the data to the RS when errors are detected in the data.

17. The retransmission method of claim 16, further comprising transmitting scheduling information for data transmission of the lower node to at least one of the lower node and the RS, wherein the transmitting comprises transmitting the scheduling information for transmission of the error report information to the RS, taking into account a data transmission time of the lower node.

18. The retransmission method of claim 16, wherein the error report information is configured in the form of one of a physical channel defined for reporting presence or absence of errors, a control message, a Medium Access Control (MAC) subheader, and a MAC header.

19. The retransmission method of claim 16, wherein the error report information includes at least one of an Identifier (ID) of the RS, an ID of the lower node that transmitted the data to the RS, a sequence number identifying a data block received from the lower node, and an indication bit indicating whether the data block has errors according to the sequence number of the data block.

20. The retransmission method of claim 16, wherein if Medium Access Control (MAC) retransmission is performed, the error report information includes at least one of a Connection ID (CID) of the RS, a CID of the lower node that transmitted the data to the RS, a Block Sequence Number (BSN) identifying a data block received from the lower node, a retransmission type, and an indication bit indicating whether the data block has errors according to the BSN of the data block.

21. The retransmission method of claim 16, wherein if physical layer retransmission is performed, the error report information includes at least one of a Connection ID (CID) of the RS, a CID of the lower node that transmitted the data to the RS, a Hybrid Automatic Repeat reQuest Channel ID (ACID) being a sequence number identifying a data block received from the lower node, a SubPacket ID (SPID) identifying a subdata block in the ACID, an ARQ Identifier_Sequence Number (AI_SN) indicating whether the data is retransmission data, a retransmission type, and an indication bit indicating whether the data block has errors.

22. The retransmission method of claim 16, wherein the retransmission requesting comprises:
    transmitting a Negative ACK (HACK) representing the presence of errors to the RS; and
    transmitting scheduling information for data retransmission to the RS.

23. The retransmission method of claim 16, wherein the retransmission requesting comprises transmitting scheduling information for data retransmission to the RS.

24. The retransmission method of claim 16, if the data is retransmitted, further comprising:
    checking a lifetime for the retransmission; and
    ending the data retransmission when the lifetime expires.

25. The retransmission method of claim 16, further comprising transmitting information indicating that the data has no errors to at least one of the RS and the lower node, if the data received from the RS has no errors.

26. The retransmission method of claim 16, wherein the scheduling information for transmission of the error report information includes at least one of a time to transmit the error report information and resource allocation information for transmission of the error report information.

27. The retransmission method of claim 16, further comprising transmitting an ACK representing the absence of errors to the MS, upon receipt of an ACK representing the absence of errors in the data received from the lower node from the RS.

28. The retransmission method of claim 16, wherein the error report information received from the RS indicates whether there are errors in data transmitted directly from the lower node to the BS.

29. A retransmission apparatus of a Relay Station (RS) in a wireless communication system using relaying, the apparatus comprising:
    an error checker for checking for errors in data received from a lower node;
    a data queue for storing data without errors;
    a retransmission controller for controlling data retransmission, upon receipt of a retransmission request from an upper node;
    an information generator for generating error report information indicating whether data received from the lower node has errors; and
    a transmitter for transmitting the error report information to the upper node,
    wherein when the transmitted error report information is an ACKnowledgment (ACK), the transmitter transmits the data received from the lower node to the upper node according to the scheduling information received from the upper node, and retransmits the data to the upper node, upon receipt of a retransmission request signal from the upper node.

30. The retransmission apparatus of claim 29, wherein the information generator generates the error report information in the form of one of a physical channel defined for reporting presence or absence of errors, a control message, a Medium Access Control (MAC) subheader, and a MAC header.

31. The retransmission apparatus of claim 29, wherein the information generator generates the error report information so that the error report information includes at least one of an Identifier (ID) of the RS, an ID of the lower node that transmitted the data to the RS, a sequence number identifying a data block received from the lower node, and an indication bit indicating whether the data block has errors according to the sequence number of the data block.

32. The retransmission apparatus of claim 29, wherein if Medium Access Control (MAC) retransmission is performed, the information generator generates the error report information so that the error report information includes at least one of a Connection ID (CID) of the RS, a CID of the lower node that transmitted the data to the RS, a Block Sequence Number (BSN) identifying a data block received from the lower node, a retransmission type, and an indication bit indicating whether the data block has errors according to the BSN of the data block.

33. The retransmission apparatus of claim 29, wherein if physical layer retransmission is performed, the information generator generates the error report information so that the error report information includes at least one of a Connection ID (CID) of the RS, a CID of the lower node that transmitted the data to the RS, a Hybrid Automatic Repeat reQuest Channel ID (ACID) being a sequence number identifying a data block received from the lower node, a SubPacket ID (SPID) identifying a subdata block in the ACID, an ARQ Identifier_Sequence Number (AI_SN) indicating whether the data is retransmission data, a retransmission type, and an indication bit indicating whether the data block has errors.

34. The retransmission apparatus of claim 29, further comprising a data generator for generating data to be retransmitted to the upper node using the data stored in the data queue under the control of the retransmission controller, wherein the transmitter transmits the data generated from the data generator to the upper node.

35. The retransmission apparatus of claim 29, further comprising a retransmission timer for managing a retransmission lifetime, if data is retransmitted, wherein the retransmission controller ends the data retransmission when the retransmission lifetime expires.

36. The retransmission apparatus of claim 29, wherein the errors checked for in the data are transmitted directly from the lower node to the upper node.

* * * * *